United States Patent [19]

Luciani et al.

[11] 4,051,313

[45] Sept. 27, 1977

[54] PROCESS FOR PURIFYING POLYPROPYLENE

[75] Inventors: Luciano Luciani; Gianni Nava, both of Ferrara, Italy

[73] Assignee: Montedison S.p.A., Milan, Italy

[21] Appl. No.: 626,704

[22] Filed: Oct. 29, 1975

Related U.S. Application Data

[63] Continuation of Ser. No. 494,221, Aug. 2, 1974, abandoned.

[30] Foreign Application Priority Data

Aug. 3, 1973 Italy .................................. 27504/73

[51] Int. Cl.$^2$ ............................................... C08F 6/08
[52] U.S. Cl. ..................................... 528/496; 528/495
[58] Field of Search ........................... 450/772, 772.5; 260/94.9 F; 528/495, 496

[56] References Cited

FOREIGN PATENT DOCUMENTS

| 641,792 | 5/1962 | Canada ................................. 450/772 |
| 840,233 | 7/1960 | United Kingdom ................. 450/772 |
| 937,605 | 9/1963 | United Kingdom ................. 450/772 |

*Primary Examiner*—William F. Hamrock

[57] ABSTRACT

Polypropylene obtained by polymerizing propylene in contact with stereospecific catalysts supported on anhydrous magnesium dihalides is purified, and the magnesium content thereof is reduced, by treating a suspension of the polypropylene in a hydrocarbon solvent with an aliphatic alcohol containing from 3 to 8 carbon atoms, followed by centrifuging to remove both the hydrocarbon solvent and the catalyst residues solubilized by the alcohol treatment.

6 Claims, No Drawings

PROCESS FOR PURIFYING POLYPROPYLENE

This is a continuation of application Ser. No. 494,221 filed Aug. 2, 1974, now abandoned.

BACKGROUND OF THE INVENTION

It has been disclosed by our group that the polymerization of propylene in contact with stereospecific catalysts supported on anhydrous magnesium dihalides has important advantages.

According to one such method, propylene is polymerized in contact with a catalytic system prepared by mixing A. an alkyl aluminum compound complexed with an electron-donor compound, particularly an organic ester such as ethyl anisate, ethyl benzoate, etc. with B. a titanium tri- or tetrahalide in which the halogen is Cl, Br or I, and preferably Ti Cl$_4$, or a complex of the Ti halide with an electron-donor compound, supported on anhydrous Mg dihalide, e.g., Mg Cl$_2$.

The preparation of such supported catalysts has been described.

The polymerization is carried out in liquid phase either in the presence or absence of solvents such as aliphatic or cycloaliphatic hydrocarbons, e.g., n-pentane, n-hexane, n-heptane or cyclohexane.

Alkyl aluminum compounds useful in preparing catalyst-forming component (A) include triethyl aluminum, tri-isobutyl aluminum, tri-n-octyl aluminum and diethyl aluminum monochloride. Preferably, catalyst-forming component (A) is triethyl aluminum complexed with the electrondonor.

Catalyst-forming component (B) is preferably a supported catalytic complex of the type Ti Cl$_4$.ethyl benzoate or of the type Ti Cl$_4$.2 ethyl benzoate.

In the organometallic component (A) consisting of the aluminum alkyl partially complexed with the electron donor, the molar ratio aluminum alkyl/electron donor may vary from 1 to 20. Best results are obtained when the complex-forming electron donor is ethyl anisate; good results are also obtained when it is ethyl benzoate. The preferred organometallic component (A) is an aluminum triethyl/ethyl anisate complex in a molar ratio of 3.

Polymerization of propylene in the presence of the supported catalysts results in very high yields of polypropylene, from 50,000 to 200,000 and more grams of polymer per gram of titanium used, and thus results in a polypropylene having a low content of catalytic residues. In some instances, especially when a polypropylene having a high isotacticity index is desired, in which event the polymer yield is lower, it is convenient to reduce the content of catalytic residues by subjecting the polypropylene to suitable after-treatments.

THE PRESENT INVENTION

One object of this invention is to provide a process for reducing the content of magnesium in the polypropylene obtained by polymerizing propylene in the presence of the catalysts supported on a magnesium dihalide.

This and other objects are accomplished by the invention in accordance with which the catalytic residues present in the polypropylene are solubilized by treating a suspension of the polymer in a hydrocarbon solvent with an aliphatic alcohol containing from 3 to 8 carbon atoms.

In a presently preferred embodiment, isopropyl alcohol or n-butyl alchohol is mixed with the suspension of the polymer in the hydrocarbon solvent in an amount of 1 to 10%, preferably 2 to 3% by volume based on the volume of the hydrocabon solvent. Treatment of the hydrocarbon solvent suspension with the alcohol is carried out at a temperature of from 60° C to 100° C for a time sufficient to solubilize most of the catalytic residues. At the end of the treatment, both the solvent and the solubilized catalytic residues are separated from the polymer by centrifuging.

The hydrocarbon solvent used to prepare the suspension may be an aliphatic, cycloaliphatic or aromatic hydrocarbon solvent.

The purifying process of this invention is particularly applicable to polypropylene obtained by polymerizing propylene in contact with the catalysts supported on anhydrous magnesium dihalides in a hydrocarbon polymerization solvent since the alcohol can be added to the polymerization slurry flowing out of the reactor. The polypropylene thus obtained has, besides a very low content of catalytic residues, a high isotacticity index inasmuch as the non-isotactic polymer (atactic macromolecules) are dissolved out of the polymer by the alcohol treatment under heating.

The following examples are given to illustrate the invention in more detail and are not intended to be limiting.

EXAMPLE 1

In this and the following examples, the catalyst used was obtained by mixing (A) Al Et$_3$ partially complexed with ethyl anisate in a molar ratio Al Et$_3$/ethyl anisate of 3.14, with (B) the complex Ti Cl$_4$.ethyl benzoate supported on anhydrous Mg Cl$_2$.

The supported catalytic component (B) was prepared by introducing Ti Cl$_4$ into a heptane solution of ethyl benzoate in slight excess. The complex which precipitated was washed repeatedly with heptane and then dried. Anhydrous Mg Cl$_2$ was ground for 50 hours in a mill of the Vibratom type. The support thus obtained was then co-ground in the same mill with the Ti Cl$_4$.ethyl benzoate in an amount such that the supported catalytic component, (A), contained 3% of titanium.

The other catalytic component was prepared at the moment of its use in the polymerization by introducing the ethyl anisate into a heptane solution of Al Et$_3$ in a ratio such that the complex formed had a molar ratio Al Et$_3$/ethyl anisate of 3.14.

Propylene was polymerized as follows: the following substances were introduced into an autoclave in this order: 0.6 liter of n-heptane, 0.1230 gm of the supported catalytic component suspended in heptane with part of catalytic component (A) and, finally, the remainder of (A) in an amount such that the amount of (A) is such that the amount of Al Et$_3$ is 1.135 gms. The solvent was then saturated with propylene, brought to a temperature of 60° C, and the polymerization was continued for 5 hours while maintaining the pressure at 5.4 atm. by the continuous addition of propylene. The polymerization slurry was then withdrawn from the reactor and treated for one hour at 90° C under stirring with 2% by volume of isopropanol. The concentration of the polymer in the slurry in the purification phase amount to 300 g/liter. The mass was then centrifuged to remove the solvent and solubilized catalyst residues from the polymer and the polypropylene was dried at 70° C in a nitrogen atmosphere, to obtain 185 gms. of purified polymer.

By analysis, a sample of the final polypropylene contained 24 ppm of Mg, 4 ppm of Ti, 120 ppm of Cl and 0.07% total ashes in contrast to polypropylene separated from the slurry without treatment with the alcohol which contained 132 ppm of Mg. 20 ppm of Ti. and 450 ppm of Cl.

EXAMPLE 2-6

The procedure was the same as described in Example 1, except that the polymerization solvent was de-aromatized hexane and, in examples 2, 3 and 6, the alcohol used in the purification treatment was n-butanol.

The operating condictions, and the results obtained, are reported in the following Table.

TABLE

| | | Polymerization | | | | | | | Purification | | | Ash composition in centrif. polymers. | | | |
|---|---|---|---|---|---|---|---|---|---|---|---|---|---|---|---|
| | | | Catalyst TiCl$_4$. ethyl benzoate | | Molar rat. AlE$_3$/ | | Ti, Cl and Mg in polymer | | | Alcohol | | | | | | |
| Ex. n° | Reaction condit. | Solvent | on MgCl$_2$; Ti=3%-(g) | AlEt$_3$ (g) | ethyl-lanisate | Polymer (g) | Ti ppm | Cl ppm | Mg ppm | (2 % vol.) | Temp. °C | Time hrs | Ti ppm | Cl ppm | Mg ppm | TOTAL ashes % |
| 2 | 60° C 5.4 atm 5 hrs | dearomat. hexane 0.6 lt. | 0.1290 | 1.135 | 3.14 | 208 | 19 | 418 | 123 | n-butyl | 65 | 1 | 6 | 135 | 29 | 0.07 |
| 3 | " | " | 0.1096 | " | " | 165 | 20 | 455 | 132 | " | 90 | 1 | 4 | 105 | 19 | 0.07 |
| 4 | " | " | 0.1330 | " | " | 200 | 20 | 450 | 132 | iso-propyl | 65 | 1 | <4 | 130 | 30 | 0.05 |
| 5. | " | " | 0.1250 | " | " | 175 | 21 | 481 | 142 | " | 65 | 1 | <4 | 90 | 15 | 0.04 |
| 6 | " | dearomat. hexane 50 lt. | 6.0000 | 55.000 | " | 10.300 | 17 | 395 | 116 | n-butyl | 90 | 1 | 6 | 80 | 14 | 0.065 |

Slurry concentration in the purification phase: 300 g/lt for examples 2, 3, 4.
125 g/lt for examples 5, 6.

We claim:

1. A process for practically completely removing magnesium dihalide from a polypropylene obtained by polymerizing propylene in contact with a catalyst prepared by mixing (A) an aluminum trialkyl partially complexed with an electron-donor compound with (B) a titanium tri- or tetra-halide supported on an anhydrous magnesium dihalide, or a complex of a titanium tri- or tetra-halide with an electron donor compound supported on an anhydrous magnesium dihalide, and which polypropylene contains catalyst residues including magnesium dihalide, said process comprising mixing an aliphatic alcohol containing from 3 to 8 carbon atoms with a suspension of the polypropylene in a hydrocarbon solvent at a temperature of from 60° C to 100° C to thereby solubilize catalyst residues present in the polypropylene, including the magnesium halide, and thereafter separating both the solvent and the solubilized catalyst residues including the solubilized magnesium dihalide, from the polypropylene.

2. The process according to claim 1, in which the solvent and the solubilized catalyst residues are separated from the polypropylene by centrifuging.

3. The process according to claim 1, in which the propylene is polymerized in an inert hydrocarbon solvent and the resulting slurry comprising polypropylene withdrawn from the polymerization reactor is treated with the alcohol.

4. The process of claim 1, in which the aliphatic alcohol is used in an amount of from 1 to 10% by volume, based on the volume of the hydrocarbon solvent in which the polymerizate to be purified is suspended.

5. The process according to claim 1, in which the aliphatic alcohol is isopropanol.

6. The process according to claim 1, in which the aliphatic alcohol is n-butanol.

* * * * *

UNITED STATES PATENT OFFICE
CERTIFICATE OF CORRECTION

Patent No. 4,051,313          Dated September 27, 1977

Inventor(s) Luciano LUCIANI et al

It is certified that error appears in the above-identified patent and that said Letters Patent are hereby corrected as shown below:

Cols. 3 and 4 - <u>6th heading of Table</u>:

"Molar rat. $AlE_3$/ethyl-lanisate" should be

- - - Molar rat. $AlEt_3$/ethy-lanisate - - -.

Signed and Sealed this

Fifteenth Day of May 1979

[SEAL]

Attest:

RUTH C. MASON
Attesting Officer

DONALD W. BANNER
Commissioner of Patents and Trademarks